United States Patent

[11] 3,578,341

| [72] | Inventor | Arthur H. Le Febrve<br>Washington Township, N.J. |
|---|---|---|
| [21] | Appl. No. | 730,801 |
| [22] | Filed | May 21, 1968 |
| [45] | Patented | May 11, 1971 |
| [73] | Assignee | Singer-General Precision, Inc.<br>Little Falls, N.J. |

[54] SEAL ASSEMBLY FOR A HYDRAULICALLY OPERATED CYLINDER
10 Claims, 3 Drawing Figs.

[52] U.S. Cl. ..................................................... 277/3,
277/19, 277/59
[51] Int. Cl. ...................................................... F16j 15/00
[50] Field of Search........................................... 277/59, 3,
17—21, 63, 68, 73, 165

[56] References Cited
UNITED STATES PATENTS

| 2,155,628 | 4/1939 | Williams........................ | 277/3 |
| 2,162,486 | 6/1939 | Tourneau...................... | 277/59X |
| 2,175,868 | 10/1939 | Bentley......................... | 277/3 |
| 2,784,013 | 3/1957 | Groen........................... | 277/165 |
| 2,971,783 | 2/1961 | Laser............................ | 277/59X |
| 3,403,915 | 10/1968 | Roberts........................ | 277/59X |
| 3,463,270 | 8/1969 | Lundstrom et al............ | 184/39 |

*Primary Examiner*—Laverne D. Geiger
*Assistant Examiner*—Edward J. Earls
*Attorneys*—S. A. Giarratana, G. B. Oujevolk and S. M. Bender

ABSTRACT: A seal assembly for a hydraulically operated cylinder comprising a pair of sealing members acting between the cylinder end cap and the operating shaft to seal the hydraulic operating fluid from the ambient fluid. A pressurized fluid is disposed between the sealing members and acts on the shaft to control the pressure differentials across each of the sealing members.

Patented May 11, 1971
3,578,341
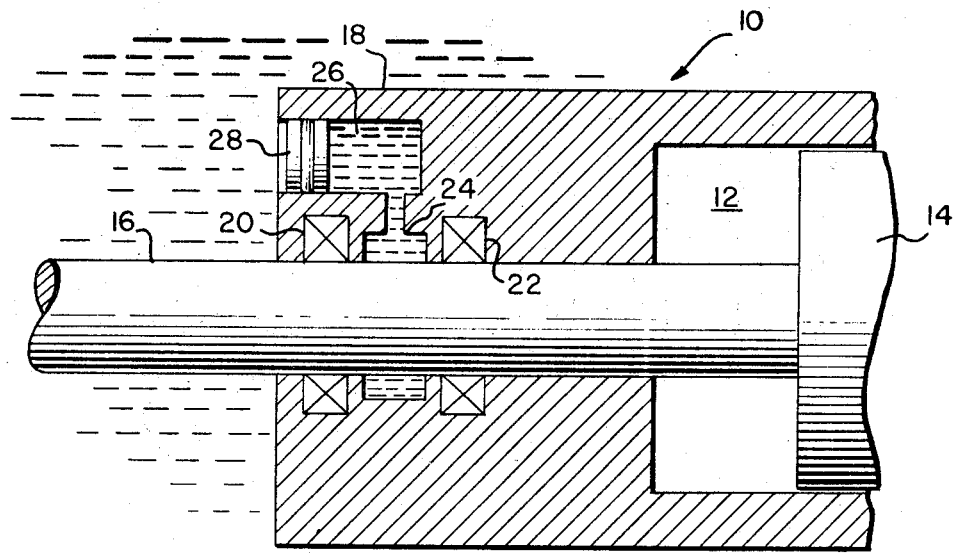
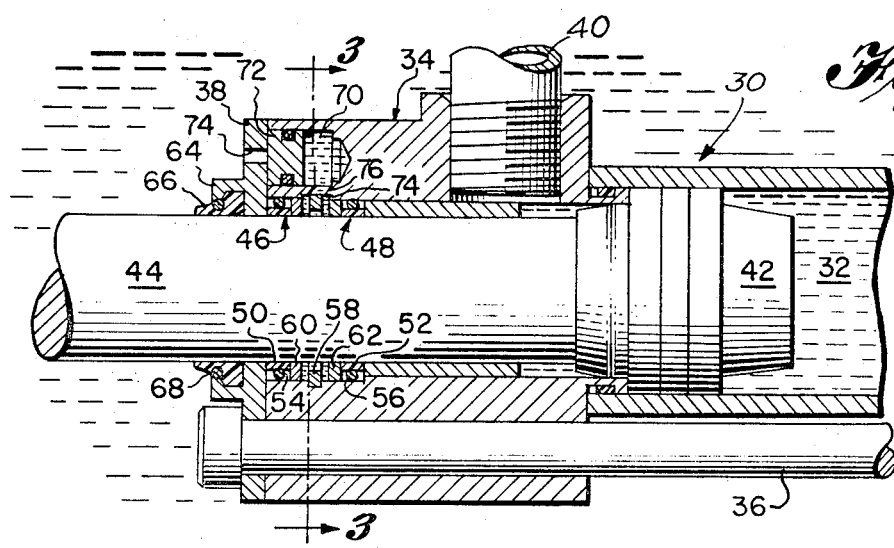
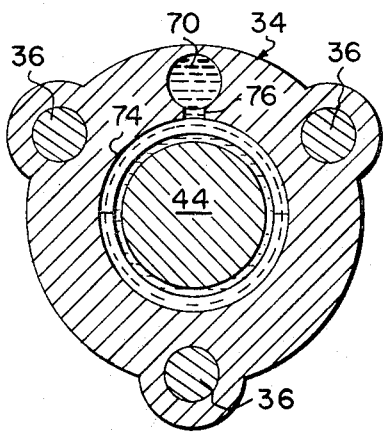
INVENTOR
ARTHUR H. LEFEBVRE
BY S. Michael Bender
ATTORNEY 3,578,341

SEAL ASSEMBLY FOR A HYDRAULICALLY OPERATED CYLINDER

BACKGROUND OF THE INVENTION

This invention relates to a device for sealing a shaft in a hydraulically operated cylinder and, more particularly, to such a device in which a pair of seals are provided to prevent the cylinder operating fluid from leaking out along the shaft.

Although it is generally known to provide a pair of seals to perform the above sealing function in such an arrangement, these proposals normally utilize a drain vent from a cavity between the two seals to dispose of leakage from either seal. However, this requires an environment into which the drained fluid can be discharged. Therefore, in applications requiring an operating environment which cannot accommodate or receive the leakage, severe operational limitations are imposed. This problem becomes particularly acute, for example, when hydraulically operated cylinders are submerged in water, since there is clearly no intermediate atmosphere to receive the shaft seal leakage. Thus, a contamination of the leakage of water into the cylinders through the shaft seal interface may occur, which will severely limit the operation of the cylinder.

SUMMARY OF THE INVENTION

It is therefore an object of the present invention to provide a seal assembly for a hydraulically operated cylinder which may be operated under severe ambient conditions while minimizing leakage through the shaft seal interface.

Briefly summarized, the seal assembly of the present invention includes a pair of sealing members for the operating fluid extending between the operating shaft and the end portion of the cylinder, along with a pressurized fluid located between the sealing members for controlling the pressure differentials across the sealing members.

BRIEF DESCRIPTION OF THE DRAWINGS

Reference is now made to the accompanying drawings for a better understanding of the nature and objects of the seal assembly of the present invention, which drawings illustrate the best mode presently contemplated for carrying out the objects of the invention and its principles, and are not to be construed as restrictions or limitations on its scope. In the drawings:

FIG. 1 is a diagrammatic cross-sectional view illustrating the principles of the present invention;

FIG. 2 is a longitudinal cross-sectional view showing one embodiment of the present invention; and FIG. 3 is a transverse cross-sectional view taken along line 3–3 of FIG. 2.

DESCRIPTION OF THE PREFERRED EMBODIMENTS

Referring to FIG. 1, which is a diagrammatic view illustrating the theory of operation of the present invention, the reference numeral 10 refers to a hydraulically operated cylinder which is submerged in water and which has a central bore 12 through which hydraulic fluid is passed to effect reciprocal motion of a piston 14, in a known manner. A piston rod or operating shaft 16 of the piston 14 passes through a bore formed in the cylinder end cap 18, and a pair of sealing members 20 and 22 are provided in the end cap 18 to seal the hydraulic fluid in the bore 12 from the ambient water.

According to the present invention, a radial cavity 24 is formed in the end cap 18 in communication with an axially extending cavity 26 and a high viscosity lubricating fluid is contained in these cavities. A piston 28 is sealingly mounted in the cavity 26 for slidable movement and has one face exposed to the ambient water.

It is thus clear from a study of FIG. 1 that, due to the action of the fluid in the cavities 24 and 26 on the shaft 16 in response to the movement of the piston 28, the pressure differential across the outboard sealing member 20 is reduced to substantially zero, since the pressure of the ambient water acts directly on one end of the seal, and on the other end of the seal through the piston 28 and the fluid contained in the cavities 24 and 26. This is highly desirable since the outboard sealing member 20 is sealing against corrosive, contaminating, nonlubricating and otherwise difficult to seal media where operation at a zero pressure differential is a distinct advantage for efficient seal operation. On the other hand, the inboard sealing member 22 is subjected to a relatively high pressure differential but the effect of this is minimized due to the fact that the fluid disposed in the cavities 24 and 26 can be selected to be chemically and physically compatible with the operating fluid disposed in the bore 12.

A specific embodiment of the present invention incorporating the above theory is shown in FIGS. 2 and 3. A hydraulic cylinder 30 having a central bore 32 is shown submerged in water. An end cap assembly 34 is fastened to one end of the cylinder 30 by means of three tie rods 36 passing through the end plate 38 and to another end plate or the like (not shown). A port 40 is provided in the end cap assembly 34 for the passage of operating fluid into and from the bore 32 to effect the reciprocating motion of the piston 42 in a known manner. An operating shaft 44 is mounted for slidable movement in a bore formed in the end cap assembly 34.

Groove means are provided in the end cap assembly to receive a pair of shaft sealing assemblies 46 and 48 to seal the operating fluid from the ambient water in a manner similar to the sealing members 20 and 22 discussed in connection with FIG. 1 above. These shaft sealing assemblies comprise a cap 50 and 52, respectively, in sealing assemblies with shaft 44 and backed by O-rings 54 and 56, respectively. Cap 50 and 52 is preferably composed of a material, commonly sold under the trademark, Teflon. A trapped split thrust ring 58 is provided between the shaft sealing assemblies 46 and 48 in a notch formed in the inner wall of the end cap assembly 34. This thrust ring, along with a pair of spacers 60 and 62 disposed between the thrust ring and the shaft sealing assemblies 46 and 48, respectively, maintain each shaft sealing assembly in a spaced relationship to either side of the cavity 7. Since the thrust ring 58 is secured in a notch it will remain stationary despite any differential thrusts or forces acting thereon. A flange 64 is provided on the end plate 38 and is shaped to accommodate a resilient sealing member 66, the lip of which is pressed against the shaft 44 by means of an O-ring 68.

An axially extending cavity 70 is formed in the end cap assembly 34 and accommodates a piston 72 sealingly mounted for slidable movement therein, and vented to the surrounding fluid by a hole 74 through the end plate 38. The slot which accommodates the split thrust ring 58 is enlarged in width as shown at 74 in FIG. 2, and is communicated with the cavity 70 by means of a port 76. A high viscosity fluid, such as silicon grease, which is chemically and physically compatible with the cylinder operating fluid is contained in cavity 70 and, due to the action of piston 72 in response to the pressure of the ambient water, passes through the port 76 and the enlarged slot 74 to act on the shaft 44.

Therefore, for the reasons discussed above in connection with FIG. 1, the pressure differential across the outboard shaft sealing assembly 46 will be reduced to substantially zero, while the effect of any leakage through the inboard shaft sealing assembly 48 will be minimized due to the physical and chemical compatibility between the silicon grease and the cylinder operating fluid.

It is emphasized that the above embodiment is shown only by way of example, and many variations thereof can be effected without departing from the basic inventive concept. Specifically, the pressurizing means for the fluid in the cavity 70 may be from a source separate from the ambient pressure. For example, it may be obtained from the pressure of the operating fluid in the bore 32 in a similar manner as discussed above, in the event it is desired to reduce the pressure differential over the inboard shaft sealing assembly 48 to zero. Also, the pressure on the fluid in the cavity 70 can be obtained from an external pressurizing mechanism which would permit the use, for example, of an intermediate pressure to be applied to the latter fluid.

As further examples of variations in the present invention, the piston and operating shaft motion may be rotary and/or the cylinder may be movable with respect to the piston, etc. Further, the above-mentioned sealing members, including the intermediate seal, may be located in the shaft rather than in the cylinder end cap assembly, and the cavity 70 may extend in a radial, rather than axial, direction.

Of course, other variations of the specific construction and arrangement of the seal assembly disclosed above can be made by those skilled in the art without departing from the invention as defined in the appended claims.

I claim:

1. A seal arrangement for a fluid operated assembly comprising a tubular member having an elongate bore therein, said elongate bore having an inner surface having a longitudinal axis, a reciprocating shaft member extending into said bore, said shaft member having an outer surface, said shaft member being arranged to reciprocate in said bore along said axis, groove means defining first and second axially spaced annular interior seal receiving positions adjacent the bore inner surface and facing the outer surface of said shaft member, a first sealing means disposed in said first seal receiving portion and acting on said shaft member, one end of said first sealing means being subjected to the pressure of an ambient fluid surrounding said assembly, a second sealing means disposed in said second seal receiving portion and acting on said shaft member, one end of said second sealing means being subjected to the pressure of the operating fluid for said assembly, an annular space defined in said tubular member between said seal receiving portions and facing the outer surface of said shaft member, a fluid disposed in said annular space, means to transmit the ambient fluid pressure to said fluid in said annular space to equalize the pressure across said first sealing means, a thrust ring disposed in an annular notch in said bore inner surface and extending between said sealing means, and a spacer between said thrust ring and each of said sealing means, wherein said first and second sealing means each comprises an inner seal ring and an outer seal ring, each of said inner seal rings being arranged to bear against said shaft outer surface, each of said outer seal rings being arranged to bear against its corresponding inner seal ring and against the bore inner surface.

2. The seal arrangement as defined in claim 1 wherein said thrust ring is radially aligned in a spaced relationship to said annular space and is adapted to maintain said first and second sealing means in a spaced relationship to either side of said annular space.

3. The seal arrangement as defined in claim 1 wherein said inner seal rings are composed of a material having a relatively higher hardness and having a relatively lower coefficient of friction than the material of said outer seal rings, and wherein said outer seal rings are O-rings arranged to bear against said bore inner surface and to apply respective bearing forces against said respective inner seal rings urging said inner seal rings against said shaft outer surface.

4. The seal arrangement as defined in claim 1 wherein a cavity containing fluid is formed in said tubular member in communication with said annular space, wherein said pressure transmitting means comprises a piston member sealingly mounted in said cavity for slidable movement and having one face thereof exposed to the fluid in said cavity and the other face thereof exposed to said ambient fluid, and further comprising means defining a third annular inner seal receiving portion adjacent said bore inner surface and axially spaced from said first seal receiving portion, a third sealing means received in said third seal receiving portion, said third sealing means comprising an inner seal ring and an outer seal ring, said inner seal ring being arranged to bear against said shaft outer surface, said outer seal ring being arranged to bear against said adjacent inner seal ring, said third inner seal ring having a lip portion extending in an axial direction.

5. In a fluid operated assembly having first and second members movable relative to one another, said first member being an elongate tubular member having an inner surface having a longitudinal axis, said second member being an elongate reciprocating member having an outer surface facing said inner surface for axial displacement relative to said first member, groove means defining first and second axially spaced annular interior seal receiving portions adjacent said inner surface facing said outer surface, said inner surface and said outer surface forming an inboard chamber therebetween for containing operating fluid, the improvement comprising an annular space formed in said first member between said annular seal receiving portions, a pressurized fluid disposed in said annular space and acting on said second member, a first sealing means disposed in said first seal receiving portion and acting on said second member to establish a seal between said pressurized fluid and the operating fluid of said assembly, said pressurized fluid being chemically and physically compatible with said operating fluid, means to transmit the ambient fluid pressure to said pressurized fluid in said annular space to equalize the pressure across said first sealing means, a thrust ring disposed in an annular notch in said inner surface and extending between said sealing means, and a spacer between said thrust ring and each of said sealing means, wherein said first and second sealing means each comprises an inner seal ring and an outer seal ring, each of said inner seal rings being arranged to bear against said shaft outer surface, each of said outer seal rings being arranged to bear against its corresponding inner seal ring and also to bear against the bore inner surface.

6. The improvement of claim 5 wherein said thrust ring is radially aligned in a spaced relationship to said annular space and is adapted to maintain said first and second sealing means in a spaced relationship to either side of said annular space.

7. The improvement of claim 5 wherein a cavity is formed in said tubular member in communication with said annular space, said cavity containing said pressurized fluid, wherein said pressure transmitting means comprises a piston member sealingly mounted in said cavity for slidable movement and having one face exposed to said ambient fluid, wherein said inner seal rings are composed of a material having a relatively higher hardness and having a relatively lower coefficient of friction than the material of said outer seal rings, and wherein said outer seal rings are O-rings arranged to bear against said bore inner surface and to apply respective bearing forces against said respective inner seal rings urging said inner seal rings against said shaft outer surface.

8. The improvement of claim 7 further comprising means defining a third annular inner seal receiving portion adjacent said inner surface and axially spaced from said first seal receiving portion, and further comprising a third sealing means received in said third seal receiving portion, said third sealing means comprising an inner seal ring and an outer seal ring, said inner seal ring being arranged to bear against said shaft outer surface, said outer seal ring being arranged to bear against said adjacent inner seal ring, said third inner seal ring having a lip portion extending in an axial direction.

9. The improvement of claim 5 wherein said assembly is a fluid operated piston-cylinder assembly to be operated under water, said first member is a cylinder cap member having a bore therein and said second member is a piston rod member extending through said bore, and wherein said first and second sealing means slidably seal between the wall of said bore and said piston rod member.

10. The improvement of claim 5 wherein said pressurized fluid is a lubricating grease.